United States Patent
Watanabe

(10) Patent No.: US 9,752,443 B2
(45) Date of Patent: Sep. 5, 2017

(54) CERAMIC MATRIX COMPOSITE MEMBER AND METHOD OF MANUFACTURING THE SAME

(71) Applicant: IHI Corporation, Koto-ku (JP)

(72) Inventor: Fumiaki Watanabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 480 days.

(21) Appl. No.: 14/250,044

(22) Filed: Apr. 10, 2014

(65) Prior Publication Data

US 2014/0322024 A1 Oct. 30, 2014

Related U.S. Application Data

(63) Continuation of application No. PCT/JP2012/076160, filed on Oct. 10, 2012.

(30) Foreign Application Priority Data

Oct. 14, 2011 (JP) .................................. 2011-227221

(51) Int. Cl.
*F01D 5/30* (2006.01)
*F01D 5/28* (2006.01)
(Continued)

(52) U.S. Cl.
CPC .............. *F01D 5/284* (2013.01); *C04B 35/80* (2013.01); *C04B 37/00* (2013.01); *F01D 5/282* (2013.01);
(Continued)

(58) Field of Classification Search
CPC ...... C04B 2235/5224; C04B 2235/524; C04B 2235/5244; C04B 2235/5248;
(Continued)

(56) References Cited

U.S. PATENT DOCUMENTS

| 4,650,399 A | 3/1987 | Craig et al. |
| 5,375,978 A * | 12/1994 | Evans ............... B64C 11/26 416/224 |

(Continued)

FOREIGN PATENT DOCUMENTS

| CN | 101042055 A | 9/2007 |
| CN | 101605978 A | 12/2009 |

(Continued)

OTHER PUBLICATIONS

International Search Report issued on Dec. 25, 2012 for PCT/JP2012/076160 filed on Oct. 10, 2012 with English Translation.

(Continued)

*Primary Examiner* — William McCalister
(74) *Attorney, Agent, or Firm* — Oblon, McClelland, Maier & Neustadt, L.L.P.

(57) ABSTRACT

A ceramic matrix composite member used as a turbine blade includes a principal part forming a blade part and a dovetail part, and a subordinate part forming a platform part. A principal fiber in a ceramic fiber fabric forming the principal part is a continuous fiber. An extension direction of the principal fiber is in parallel with a direction in which stress is applied. The ceramic fiber fabrics respectively forming the principal part and the subordinate part are joined together and formed into an integrated three-pronged fiber fabric. The ceramic fiber fabric forming the principal part and the ceramic fiber fabric forming the subordinate part are integrated together by being set into a mold with the ceramic fiber fabric forming the subordinate part folded at a desired angle to the ceramic fiber fabric forming the principal part. Then, a ceramic matrix is formed in the obtained molded body.

2 Claims, 4 Drawing Sheets

(51) Int. Cl.
*C04B 35/80* (2006.01)
*C04B 37/00* (2006.01)

(52) U.S. Cl.
CPC ...... *F01D 5/3084* (2013.01); *C04B 2235/524* (2013.01); *C04B 2235/5224* (2013.01); *C04B 2235/5244* (2013.01); *C04B 2235/5248* (2013.01); *C04B 2235/5252* (2013.01); *C04B 2235/5256* (2013.01); *C04B 2235/5268* (2013.01); *C04B 2235/614* (2013.01); *C04B 2235/616* (2013.01); *C04B 2237/38* (2013.01); *C04B 2237/60* (2013.01); *C04B 2237/61* (2013.01); *F05D 2300/6033* (2013.01); *Y02T 50/672* (2013.01)

(58) Field of Classification Search
CPC .... C04B 2235/5252; C04B 2235/5256; C04B 2235/5268; C04B 2235/614; C04B 2235/616; C04B 35/80; C04B 37/00; F01D 5/282; F01D 5/284; F01D 5/3084; F05D 2300/603; Y02T 50/672
USPC ........................................................ 416/230
See application file for complete search history.

(56) References Cited

U.S. PATENT DOCUMENTS

| | | | | |
|---|---|---|---|---|
| 6,062,256 | A * | 5/2000 | Miller | F16K 31/004 137/487.5 |
| 6,142,444 | A * | 11/2000 | Kluge | F15C 3/04 137/831 |
| 6,182,941 | B1 * | 2/2001 | Scheurenbrand | F15C 5/00 137/554 |
| 6,811,136 | B2 * | 11/2004 | Eberhardt | F16K 31/006 251/129.06 |
| 7,094,021 | B2 | 8/2006 | Haubert | |
| 7,510,379 | B2 | 3/2009 | Marusko et al. | |
| 2003/0010948 | A1 * | 1/2003 | Horiuchi | G05D 7/0635 251/11 |
| 2003/0159735 | A1 * | 8/2003 | Barillot | F16K 31/004 137/554 |
| 2003/0172975 | A1 * | 9/2003 | Gilbert | F15C 5/00 137/599.07 |
| 2005/0084377 | A1 * | 4/2005 | Dambrine | B29C 70/48 416/223 R |
| 2005/0186069 | A1 | 8/2005 | Subramanian et al. | |
| 2006/0257260 | A1 | 11/2006 | Dambrine et al. | |
| 2006/0283014 | A1 * | 12/2006 | Subramanian | C04B 35/573 29/889.71 |
| 2007/0082201 | A1 | 4/2007 | Subramanian et al. | |
| 2007/0148000 | A1 | 6/2007 | Marusko et al. | |
| 2008/0132398 | A1 | 6/2008 | Kostar et al. | |
| 2011/0293828 | A1 * | 12/2011 | Eberling-Fux | C04B 35/52 427/249.2 |
| 2012/0055609 | A1 * | 3/2012 | Blanchard | B29C 70/24 156/89.11 |
| 2012/0063912 | A1 * | 3/2012 | Bouillon | C03C 3/087 416/241 B |
| 2012/0195766 | A1 * | 8/2012 | Cohin | F01D 5/225 416/241 A |
| 2013/0017093 | A1 * | 1/2013 | Coupe | B64C 11/26 416/230 |
| 2013/0259701 | A1 * | 10/2013 | Dambrine | B22F 3/15 416/229 R |
| 2014/0072443 | A1 * | 3/2014 | Mateo | F01D 5/282 416/241 R |
| 2014/0093381 | A1 * | 4/2014 | Delvaux | F01D 5/282 416/230 |
| 2014/0205463 | A1 * | 7/2014 | Herraiz | F01D 5/225 416/230 |
| 2014/0271161 | A1 * | 9/2014 | Lazur | F01D 5/282 415/200 |
| 2014/0322024 | A1 * | 10/2014 | Watanabe | C04B 35/80 416/230 |
| 2014/0367596 | A1 * | 12/2014 | Monkowski | G05D 7/0635 251/129.06 |

FOREIGN PATENT DOCUMENTS

| | | |
|---|---|---|
| EP | 2 349 688 | 8/2011 |
| FR | 2 939 129 A1 | 6/2010 |
| FR | 2 939 130 A1 | 6/2010 |
| FR | 2 943 942 A1 | 10/2010 |
| JP | 64-56902 A | 3/1989 |
| JP | 6-137103 A | 5/1994 |
| JP | 7-180503 A | 7/1995 |
| JP | 2003-148105 A | 5/2003 |
| JP | 2005-133717 A | 5/2005 |
| JP | 2005-240797 A | 9/2005 |
| JP | 2007-205350 A | 8/2007 |
| WO | WO 91/15357 A1 | 10/1991 |
| WO | WO 2010/061139 A2 | 6/2010 |
| WO | WO 2010/061140 A1 | 6/2010 |

OTHER PUBLICATIONS

International Written Opinion mailed on Dec. 25, 2012 for PCT/JP2012/076160 filed on Oct. 10, 2012.
Extended European Search Report issued Apr. 16, 2015 in Patent Application No. 12840521.4.
Combined Office Action and Search Report issued May 27, 2015 in Chinese Patent Application No. 201280049778.0 (with Partial English translation).

* cited by examiner

CENTRIFUGAL FORCE

ROTATION DIRECTION

DIRECTION OF
APPLICATION OF
CENTRIFUGAL
FORCE ⇧

CERAMIC MATRIX COMPOSITE MEMBER AND METHOD OF MANUFACTURING THE SAME

CROSS REFERENCE TO RELATED APPLICATIONS

This application is a continuation application of International Application No. PCT/JP2012/076160, filed on Oct. 10, 2012, which claims priority to Japanese Patent Application No. 2011-227221, filed on Oct. 14, 2011, the entire contents of which are incorporated by references herein.

BACKGROUND OF THE INVENTION

1. Field of the Invention

The present invention relates to a ceramic matrix composite member and a method of manufacturing the same.

2. Description of the Related Art

Jet engines and the like include components which are subjected to large stress applied in a particular direction, such as centrifugal force, while in use. Requirements for such components include particularly high strength as well as heat resistance. For this reason, the components are usually made from metallic materials. FIG. 7A is a schematic cross-sectional view of a generally-used aircraft turbo-fan engine. FIG. 7B is a schematic view magnifying one of turbine blades of the turbo-fan engine shown in FIG. 7A. While the engine is in operation, large centrifugal force is applied to the turbine blade in a longitudinal direction (radial direction) of a blade part. For this reason, the turbine blades are usually made from a Ni-based alloy or the like. As shown in FIG. 7B, a turbine blade 100 includes: a blade part 102; a platform part 104 extending in a direction vertical to a principal surface of the blade part 102; and a dovetail part 106 placed at one end portion of the blade part 102. In this manner, the turbine blade 100 has a relatively complicated shape. Nevertheless, turbine blades can be manufactured with relative ease by casting a metallic material such as a Ni-based alloy.

Ceramic matrix composite members are formed from ceramic matrix composites (CMCs) each containing ceramic fibers and a ceramic matrix. In recent years, there are growing expectations that ceramic matrix composite members will be applied to jet engine components. Ceramic matrix composite members are light in weight and excellent in heat resistance. For this reason, if ceramic matrix composite members can be used as jet engine components, it is expected that the weight and fuel consumption rate of an engine will be reduced.

U.S. Pat. No. 7,510,379, U.S. Pat. No. 7,094,021 and U.S. Pat. No. 9,650,399 have proposed a jet engine component to which ceramic matrix composites are applied, and a method of manufacturing the component. To put it specifically, these patent documents describe turbine blades formed from ceramic matrix composite members. In these turbine blades, the blade part is joined to the platform part by use of a matrix, a brazing material or the like.

SUMMARY OF THE INVENTION

The conventional turbine blade using the ceramic matrix composite member break down in some cases, because the turbine blade cannot withstand large stress (centrifugal force or the like) applied in a particular direction. The breakdown tends to start, particularly, at a portion where the parts are joined.

An object of the present invention is to solve the foregoing problem. To put it specifically, an object of the present invention is to provide a ceramic matrix composite member, which withstands large stress (centrifugal force or the like) applied in a particular direction and is accordingly less likely to break down when used as a turbine blade.

A first aspect of the present invention provides a ceramic matrix composite member to be used as a turbine blade, which includes: a principal part forming a blade part and a dovetail part; and a subordinate part forming a platform part. Here, a principal fiber in a ceramic fiber fabric forming the principal part is a continuous fiber. A direction of the principal fiber is in parallel with a direction in which stress is applied. The ceramic fiber fabric forming the principal part and a ceramic fiber fabric forming the subordinate part are joined together to form an integrated three-pronged fiber fabric. The ceramic fiber fabric forming the principal part and the ceramic fiber fabric forming the subordinate part are integrated together by being set into a mold with the ceramic fiber fabric forming the subordinate part folded at a desired angle to the ceramic fiber fabric forming the principal part. Then, a ceramic matrix is formed in the obtained molded body.

A second aspect of the present invention provides a ceramic matrix composite member to be used as a turbine blade, which includes: a principal part forming a blade part and a dovetail part; and a subordinate part forming a platform part. Here, a principal fiber in a ceramic fiber fabric forming the principal part is a continuous fiber. A direction of the principal fiber is in parallel with a direction in which stress is applied. The ceramic fiber fabric forming the principal part and a ceramic fiber fabric forming the subordinate part are joined together by stitching. Thereafter, the joined ceramic fiber fabrics are integrated together by being set into a mold with the ceramic fiber fabric forming the subordinate part folded at a desired angle to the ceramic fiber fabric forming the principal part. Then, a ceramic matrix is formed in the obtained molded body.

The present invention can provide a ceramic matrix composite member, which withstands large stress (centrifugal force or the like) applied in a particular direction and is accordingly less likely to break down when used as a turbine blade.

BRIEF DESCRIPTION OF THE DRAWINGS

FIGS. 2A and 2B show an integrated three-pronged fiber fabric of the first embodiment of the present invention, in which FIG. 2A is a schematic side view of the integrated three-pronged fiber fabric and FIG. 2B is a cross-sectional view taken along the A-A line of FIG. 2A.

DESCRIPTION OF THE PREFERRED EMBODIMENTS

The present invention has been accomplished based on the following findings. A ceramic matrix composite member includes a ceramic fiber fabric forming a principal part of the ceramic matrix composite member. A principal fiber in the ceramic fiber fabric extends in a predetermined direction (the direction will be referred to as an extension direction for the sake of explanatory convenience). When the ceramic matrix composite member is used as a turbine blade, the ceramic matrix composite member is subjected to stress, such as centrifugal force associated with its rotation. In this regard, it has been found that even if the stress is large, the ceramic matrix composite member is less likely to break down when the extension direction of the principal fiber is in parallel with the direction of the stress. Furthermore, in a case where multiple parts, which will later form the ceramic matrix composite member as the turbine blade, are molded individually and joined together after a matrix is formed with the multiple parts, the ceramic matrix composite member is more likely to break down from joining portions thus formed. In contrast, it has been found that: when the multiple parts are formed integrally and the matrix is formed in the integrally molded body, bonds among fibers of the parts become stronger and the strength becomes larger as a whole; and accordingly, the ceramic matrix composite member becomes less likely to break down.

Figure 1A:
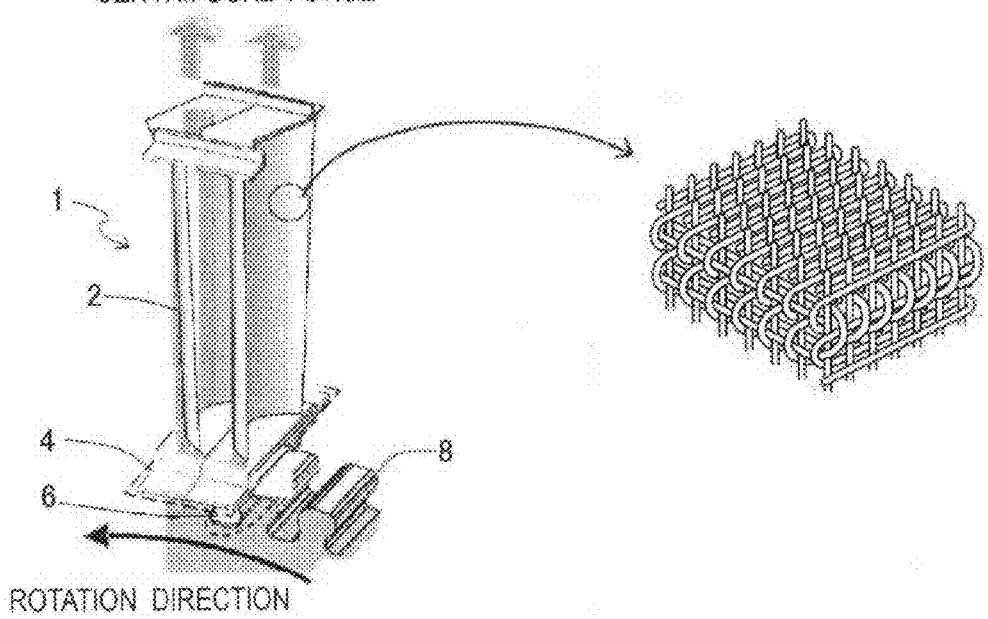
FIG. 1A is a schematic perspective view of a turbine blade of first and second embodiments of the present invention.
Figure 1B:
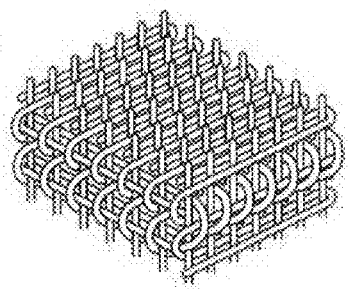
FIG. 1B is a schematic perspective view showing an example of a structure of a ceramic fiber fabric forming the turbine blade.
Figure 7A:
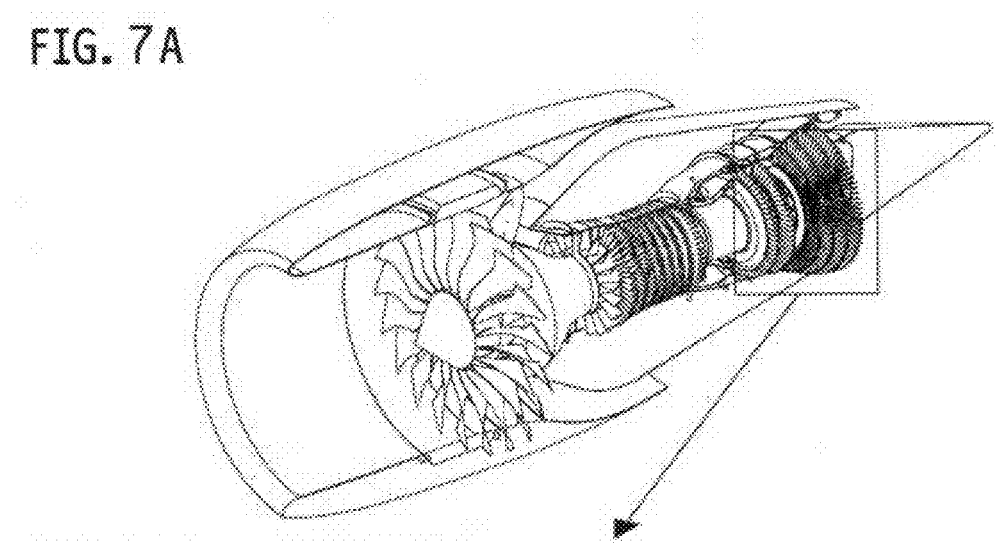
FIG. 7A is a schematic perspective view of a generally-used aircraft turbo-fan engine.
Figure 7B:
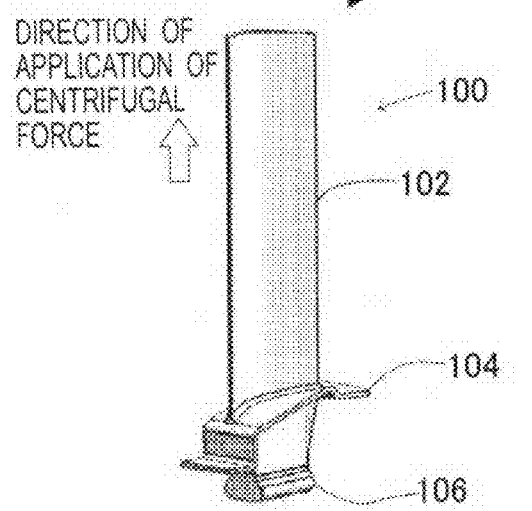
FIG. 7B is a schematic diagram magnifying one of turbine blades of the turbo-fan engine.

Descriptions will be hereinbelow provided for embodiments of the present invention. Each embodiment represents a ceramic matrix composite member to be used as a turbine blade. FIG. 1A is a schematic perspective view of a turbine blade 1 of the embodiments of the present invention. FIG. 1B is a schematic perspective view showing an example of a structure of a ceramic fiber fabric forming the turbine blade. As shown in FIG. 1A, the external shape of the turbine blade 1 may be the same as that of a generally-used turbine blade (shown in FIGS. 7A and 7B, for example).

The turbine blade 1 includes: a blade part 2 and a dovetail part 6 collectively forming a principal part; and platform parts 4 forming a subordinate part to the principal part. Each platform part 4 extends in a direction perpendicular to a principal surface of the blade part 2. The dovetail part 6 is placed at one of two end portions of the blade part 2. As shown in FIG. 1A, the dovetail part 6 is placed in an end portion closer to the center of rotation of the turbine blade 1, for example. In this case, as shown in FIG. 1A, the dovetail part 6 is fitted in a disk part 8. While the turbine blade 1 is in use, the disk part 8 rotates. This rotation applies strong centrifugal force to the turbine blade 1 in a longitudinal direction (radial direction) of the blade part 2.

As shown in FIG. 1B, a ceramic fiber fabric forming the turbine blade 1 has a three-dimensional structure. The fiber fabric having the three-dimensional structure can be obtained by: tying hundreds to thousands of ceramic fibers into a fiber bundle; and then weaving such fiber bundles in the X-, Y-, and Z-directions. To put it specifically, the fiber fabric having the three-dimensional structure can be obtained by: stacking multiple layers each obtained by arranging fiber bundles in the X-direction and in the Y-direction perpendicular to the X-direction; and stitching the multiple layers with other fiber bundles in the thickness direction of the multiple layers (in the Z-direction). It should be noted that the ceramic fiber fabric of the embodiments does not have to adopt the three-dimensional structure, or may partially adopt the three-dimensional structure.

The ceramic fiber fabric forming the principal part (i.e., the blade part 2 and the dovetail part 6) includes a principal fiber. In the embodiments, the extension direction of the principal fiber is almost in parallel with the direction of application of the centrifugal force. In this respect, the principal fiber in the ceramic fiber fabric means a group of fibers extending in a particular direction which are among the fibers included in the fiber fabric. In addition, the particular direction means the X-direction, the Y-direction or the Z-direction, for example, if the ceramic fiber fabric has the three-dimensional structure. For this reason, in this case, the principal fiber is any one of the fiber bundles in the X-direction, the fiber bundles in the Y-direction and the bundles in the Z-direction. As described above, when the direction of the centrifugal force applied to the turbine blade is almost in parallel with the direction of the principal fiber (the X-direction, the Y-direction or the Z-direction), the turbine blade is less likely to break down even if the turbine blade is subjected to large centrifugal force.

Furthermore, the principal fiber in the ceramic fiber fabric forming the principal part may be formed from a continuous fiber. In other words, the principal fiber is not cut out from one end portion to another end portion of the principal part. In this case, the principal fiber may be a monofilament formed only from one continuous fiber, or a multifilament formed from a bundle of continuous fibers. When the principal fiber extends in the direction almost in parallel with that of the centrifugal force, and concurrently when the principal fiber is formed from the continuous fiber, the principal fiber is less likely to break down even if the principal fiber is subjected to large centrifugal force. As a consequence, the principal part as a whole becomes less likely to break down and durable for use.

A first embodiment of the present invention provides a ceramic matrix composite member to be used as a turbine blade, which includes: a principal part forming a blade part and a dovetail part; and a subordinate part forming platform parts. A principal fiber in a ceramic fiber fabric forming the principal part is a continuous fiber. The direction of the principal fiber is in parallel with a direction in which centrifugal force is applied. The ceramic fiber fabric forming the principal part and the ceramic fiber fabric forming the subordinate part are unified into an integrated three-pronged fiber fabric. The ceramic matrix composite member is manufactured by: integrating the two ceramic fiber fabrics together by setting the ceramic fiber fabric forming the principal part and the ceramic fiber fabric forming the subordinate part into a mold with the ceramic fiber fabric forming the subordinate part folded at a desired angle to the ceramic fiber fabric forming the principal part; and forming a ceramic matrix in the obtained molded body.

In addition, a second embodiment of the present invention is a ceramic matrix composite member to be used as a turbine blade, which includes: a principal part forming a blade part and a dovetail part; and a subordinate part forming platform parts. A principal fiber in a ceramic fiber fabric forming the principal part is a continuous fiber. The direction of the principal fiber is in parallel with a direction in which centrifugal force is applied. The ceramic matrix composite member is manufactured by: joining the ceramic fiber fabric forming the principal part and the ceramic fiber fabric forming the subordinate part by stitching; then integrating the joined ceramic fiber fabrics together by setting the joined ceramic fiber fabrics into a mold with the ceramic fiber fabric forming the subordinate part folded at a desired angle to the ceramic fiber fabric forming the principal part; and forming a ceramic matrix in the obtained molded body.

Figure 2A:
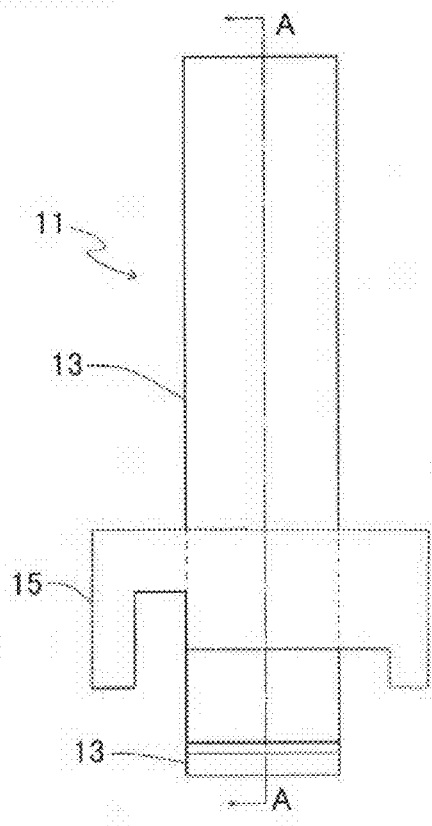
Figure 2B:
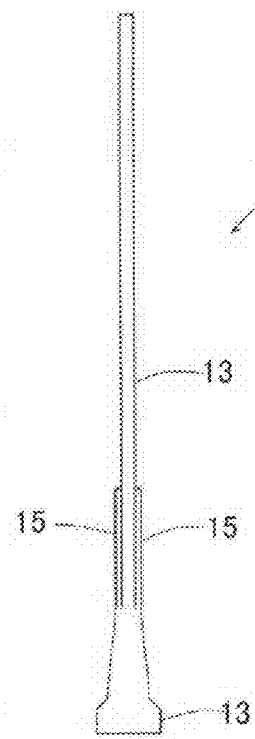

Descriptions will be provided for the first embodiment by use of FIGS. 2A to 3B. FIGS. 2A and 2B are diagrams illustrating an integrated three-pronged fiber fabric 11 in which a ceramic fiber fabric 13 forming the blade part and the dovetail part (the principal part), and ceramic fiber fabrics 15 forming the platform parts (the subordinate part) are joined together. FIG. 2A is a schematic side view of the integrated three-pronged fiber fabric 11 and FIG. 2B is a cross-sectional view taken along the A-A line of FIG. 2A.

Figure 3A:
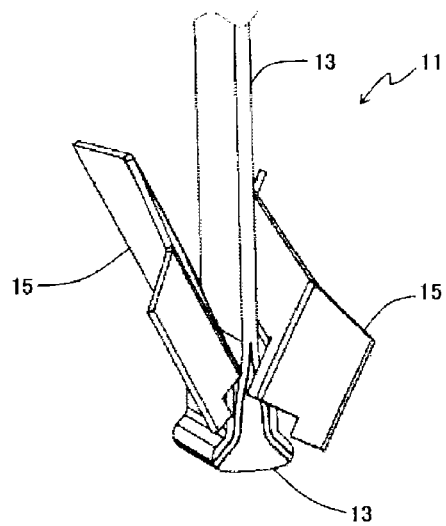
FIGS. 3A and 3B are schematic perspective views for explaining how the integrated three-pronged fiber fabric of the first embodiment of the present invention is deformed.
Figure 3B:
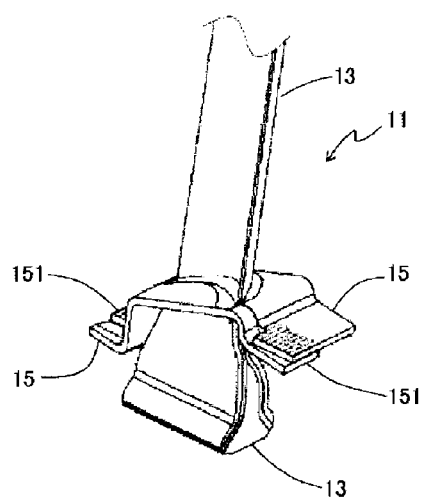

In the first embodiment, after the integrated three-pronged fiber fabric 11 is obtained, as shown in FIG. 3A, the ceramic fiber fabrics 15 forming platform parts 4 (see FIG. 1A) are folded at a desired angle to the ceramic fiber fabric 13 forming a blade part 2 (see FIG. 1A) and a dovetail part 6 (see FIG. 1A) (at almost 90 degrees in the case of the turbine blade). Thus, the fiber fabric in the aspect shown in FIG. 3B is obtained. Thereafter, overlapping portions 151 of the two fiber fabrics 15 each forming the platform part 4 are stitched together by use of other fiber bundles. This stitching makes it possible to further increase strength of the ceramic fiber fabric.

Here, the integrated three-pronged fiber fabric 11 can be manufactured by a conventional publicly-known method, for example. For instance, the integrated three-pronged fiber fabric in a desired shape can be obtained by: tying hundreds to thousands of ceramic fibers into a fiber bundle; and then weaving such fiber bundles in the X-, Y-, and Z-directions.

Furthermore, no specific restriction is imposed on the material quality, thickness or the like of the ceramic fibers. For example, ceramic fibers made of SiC, C, $Si_3N_4$, $Al_2O_3$, BN and the like may be used. Moreover, the thickness of the ceramic fibers may be the same as that of conventional publicly-known fibers. The thickness may be in a range from several micrometers to several tens of micrometers, for example.

After the fiber fabric in the aspect shown in FIG. 3B is obtained, the obtained fiber fabric is set into a mold (not illustrated) and integrated together. The mold has an internal shape corresponding to the shape of the desired molded body, and is dividable into an appropriate number (6, for example) of pieces. The fiber fabric is set into the mold while changing its shape to the mold. Thus, the fiber fabric can be integrated together in the mold. Thereafter, the ceramic matrix is formed in the obtained molded body. The forming of the ceramic matrix can be achieved, for example, by a method using a chemical reaction of a gas, a method using sintering of solid power, and the like. For example, the matrix is precipitated in a surface of the molded body through a chemical reaction by exposing the molded body, integrated in the mold, to a material gas in a chamber. Alternatively, the integrated molded body is dipped into slurry of material power solids, and is then subjected to sintering. Other methods are also applicable.

Next, descriptions will be provided for the second embodiment by use of FIGS. 4A to 6B.

Figure 4A:
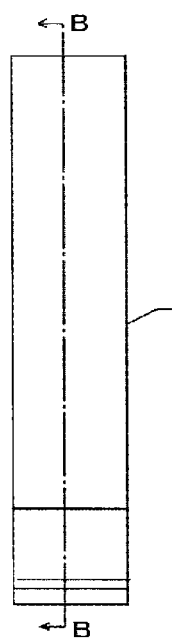
FIG. 4A is a schematic side view of a fiber fabric in a principal part of a second embodiment of the present invention.
Figure 4B:
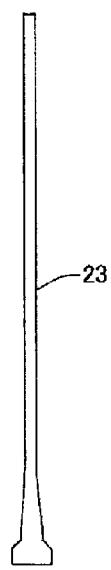
FIG. 4B is a cross-sectional view taken along the B-B line of FIG. 4A.
Figure 4C:
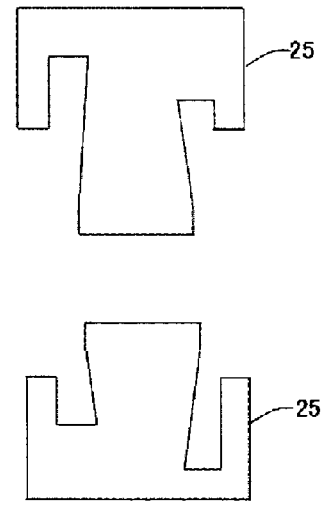
FIG. 4C is a schematic front view of two platform parts.

FIGS. 4A, 4B and 4C are diagrams illustrating a fiber fabric 23 forming the blade part and the dovetail part (the principal part), as well as fiber fabrics 25 forming the platform parts (the subordinate part). FIG. 4A is a schematic side view of the fiber fabrics 23, 25. FIG. 4B is a cross-sectional view taken along the B-B line of FIG. 4A. FIG. 4C is a schematic front view of two platform parts.

Figure 5A:
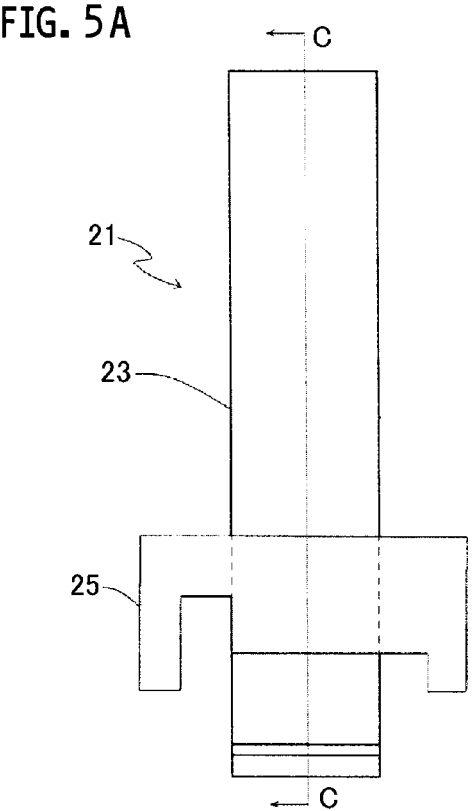
FIG. 5A is a schematic side view of the fiber fabric in the principal part of the second embodiment of the present invention.
Figure 5B:
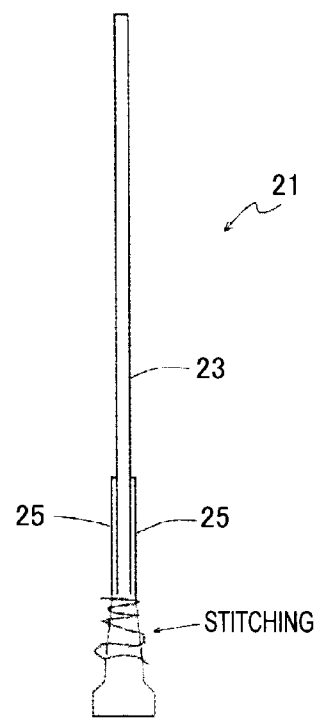
FIG. 5B is a cross-sectional view taken along the C-C line of FIG. 5A.

In the second embodiment, after the fiber fabric 23 and the fiber fabrics 25 as shown in FIGS. 4A to 4C are obtained, the fiber fabric 21 in a shape shown in FIGS. 5A and 5B is obtained by joining the fiber fabric 23 and the fiber fabrics 25 together by stitching. FIG. 5A is a schematic side view of the fiber fabric 21 obtained by stitching. FIG. 5B is a cross-sectional view taken along the C-C line of FIG. 5A. In the aspect shown in FIGS. 5A and 5B, the fiber fabric 23 and the fiber fabrics 25 are joined together by being stitched in the vicinity of the dovetail part, as shown in FIG. 5B.

Figure 6A:
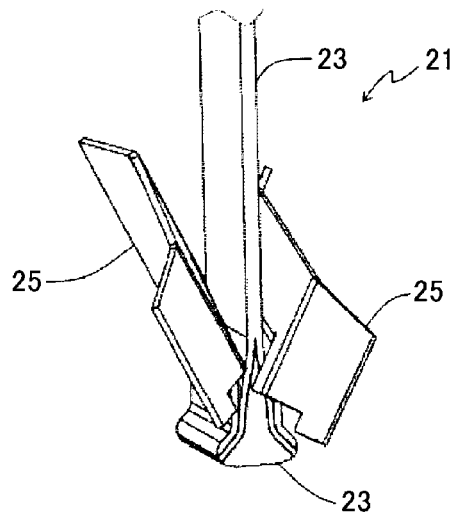
FIGS. 6A and 6B are schematic perspective views for explaining how the fiber fabric of the second embodiment of the present invention is deformed.

Subsequently, as shown in FIG. 6A, the fiber fabrics 25 forming the platform parts are folded at the desired angle to the fiber fabric 23 forming the blade part and the dovetail part (at 90 degrees in the case of the turbine blade). Thus, the fiber fabric in the aspect shown in FIG. 6A is obtained.

Figure 6B:
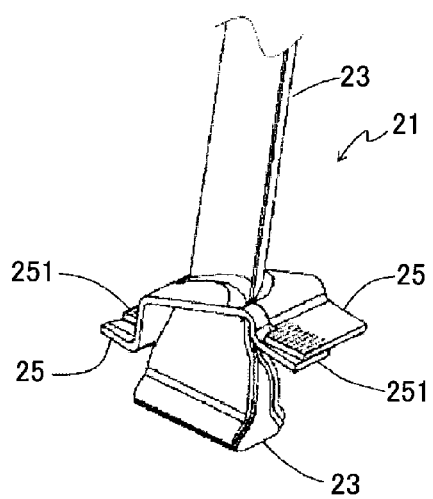

After the fiber fabric in the aspect shown in FIG. 6B is obtained, it is desirable that overlapping portions 251 of the two fiber fabrics 25 each forming the platform part be stitched together by use of other fiber bundles, because the strength of the obtained turbine blade of the present invention is further increased.

Here, no specific restriction is imposed on the method of manufacturing the fiber fabric 23 and the fiber fabrics 25. The fiber fabric 23 and the fiber fabrics 25 may be manufactured by use of a conventional, publicly-known method, for example. For instance, each fiber fabric in the desired shape can be obtained by: tying hundreds to thousands of ceramic fibers into a fiber bundle; and then weaving such fiber bundles in the X-, Y-, and Z-directions.

Furthermore, no specific restriction is imposed on the material quality, thickness or the like of the ceramic fibers. For example, ceramic fibers made of SiC, C, $Si_3N_4$, $Al_2O_3$, BN and the like may be used. Moreover, the thickness of the ceramic fibers may be the same as that of conventional publicly-known fibers. The thickness may be in a range from several micrometers to several tens of micrometers, for example.

After the fiber fabric in the aspect shown in FIG. 6B is obtained as described above, the obtained fiber fabric is set into the mold and integrated together. The shaping and the subsequent forming of the ceramic matrix are the same as the process for forming the ceramic matrix composite member of the first embodiment. To put it specifically, the ceramic matrix composite member is similarly manufactured by: setting the fiber fabrics into the divided mold integrating the fiber fabrics together; and then forming the ceramic matrix in the surface of the molded body by use of the foregoing method.

It should be noted that: the present invention is not limited to the above-described embodiments; the present invention is specified by the description in the scope of claims; and the present invention further includes all modifications which fall within the range and meanings equivalent to the description of the scope of claims.

What is claimed is:

1. A ceramic matrix composite member to be used as a turbine blade, comprising:
   a principal part forming a blade part and a dovetail part, the principal part being formed of a ceramic fiber fabric; and a subordinate part forming a platform part, the subordinate part being formed of a ceramic fiber fabric, wherein the ceramic fiber fabric of the principal part includes a continuous fiber as a principal fiber, extending in a direction in which stress is applied, and the subordinate part is joined on a side surface of the principal part in the vicinity of the dovetail part by stitching in a direction perpendicular to a longitudinal direction of the blade part, thereafter, the principal part and subordinate part thus joined are integrated together by molding with the subordinate part folded at a desired angle to the principal part, and a ceramic matrix is formed in the obtained molded body.

2. The ceramic matrix composite according to claim 1, wherein parts of the subordinate part are joined together by stitching in the longitudinal direction of the blade part at a position where the parts of the subordinate part are overlapped with each other when the subordinate part is folded.

\* \* \* \* \*